US012621235B2

(12) United States Patent
Wang et al.

(10) Patent No.: US 12,621,235 B2
(45) Date of Patent: May 5, 2026

(54) NETWORK TRAFFIC TRANSMISSION BASED ON NEXT-NEXT-HOP INDICATION

(71) Applicant: Juniper Networks, Inc., Sunnyvale, CA (US)

(72) Inventors: Kevin Wang, Acton, MA (US); Manish Gupta, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 38 days.

(21) Appl. No.: 18/533,352

(22) Filed: Dec. 8, 2023

(65) Prior Publication Data

US 2025/0141780 A1      May 1, 2025

Related U.S. Application Data

(60) Provisional application No. 63/594,202, filed on Oct. 30, 2023.

(51) Int. Cl.
H04L 45/12          (2022.01)
H04L 45/02          (2022.01)
(52) U.S. Cl.
CPC ............ H04L 45/123 (2013.01); H04L 45/04 (2013.01)
(58) Field of Classification Search
CPC .............................. H04L 45/04; H04L 45/123
See application file for complete search history.

(56) References Cited

U.S. PATENT DOCUMENTS

| | | | |
|---|---|---|---|
| 8,958,286 B1* | 2/2015 | Atlas ....................... | H04L 12/18 370/227 |
| 12,284,110 B1* | 4/2025 | Barcelo Llado ...... | H04L 45/123 |
| 2004/0210892 A1 | 10/2004 | Sharma | |
| 2007/0174483 A1* | 7/2007 | Raj .......................... | H04L 45/02 709/238 |
| 2007/0242607 A1 | 10/2007 | Sadler et al. | |
| 2014/0029445 A1* | 1/2014 | Hui .......................... | H04L 45/34 370/248 |
| 2018/0351863 A1* | 12/2018 | Vairavakkalai ....... | H04L 45/745 |
| 2020/0220803 A1 | 7/2020 | Zheng et al. | |

OTHER PUBLICATIONS

Arafat et al.; "A Q-Learning-Based Topology—Aware Routing Protocol for Flying Ad Hoc Networks"; 2021 (Year: 2021).*
Anonymous User; "BGP Next-Hop Self Explained"; Mar. 6, 2017; https://bgphelp.com/2017/03/05/bgp-next-hop-self-explained/ (Year: 2017).*
Extended European Search Report for European Application No. EP24151145 dated May 7, 2024, 9 pages.

(Continued)

*Primary Examiner* — Glenton B Burgess
(74) *Attorney, Agent, or Firm* — Harrity & Harrity, LLP

(57) ABSTRACT

In some implementations, a network device may receive an indication of a next-next-hop of the network device and link quality information of the next-next-hop. The network device may transmit network traffic based on the indication of the next-next-hop and the link quality information of the next-next-hop.

20 Claims, 7 Drawing Sheets

(56) References Cited

OTHER PUBLICATIONS

Orange, B.D., et al., Juniper Networks B et al: "BGP Next-Hop dependent capabilities; draft-IETF-IDR-next-hop-capability-02.txt" Technical Fields Searched gm BGP Next-Hop Dependent Capabilities; H04L Draft-IETF-IDR-Next-Hop-Capability-02.TXT; Internet-Draft: Network Working Group, Internet Engineering Task Force, IETF; Standardworkingdraft, Internet Society (ISOC) 4, Rue Des Falaises CH—1205 Geneva, Switzerla, No. 2, Feb. 12, 2018 (Feb. 12, 2018), pp. 1-10, XP015125684.
Workgroup: Internet Engineering Task Force; Internet-Draft: draft-ietf-idr-entropy-label-13; Oct. 9, 2023; 17 pages.

* cited by examiner

200

600

610

Receive, by a network device, an indication of a next-next-hop of the network device and link quality information of the next-next-hop

620

Transmit, by the network device, network traffic based on the indication of the next-next-hop and the link quality information of the next-next-hop

NETWORK TRAFFIC TRANSMISSION BASED ON NEXT-NEXT-HOP INDICATION

CROSS-REFERENCE TO RELATED APPLICATION

This Patent application claims priority to U.S. Provisional Patent Application No. 63/594,202, filed on Oct. 30, 2023, and entitled "BORDER GATEWAY PROTOCOL TOPOL-OGY DISCOVERY FOR CLOS NETWORK GLOBAL LOAD BALANCING." The disclosure of the prior Application is considered part of and is incorporated by reference into this Patent Application.

BACKGROUND

Network devices, such as routers, relay packets through a network from a source to a destination. When the network experiences congestion, the network devices may drop the packets, which may alleviate the congestion. Dropped packets are not received by the destination.

SUMMARY

Some implementations described herein relate to a method. The method may include receiving, by a network device, an indication of a next-next-hop of the network device and link quality information of the next-next-hop. The method may include transmitting, by the network device, network traffic based on the indication of the next-next-hop and the link quality information of the next-next-hop.

Some implementations described herein relate to a network device. The network device may include one or more memories and one or more processors. The one or more processors may be to receive a border gateway protocol (BGP) update message that contains an indication of a next-next-hop of the network device. The one or more processors may be to transmit network traffic based on the indication of the next-next-hop.

Some implementations described herein relate to a non-transitory computer-readable medium that stores a set of instructions. The set of instructions, when executed by one or more processors of a network device in a Clos network, may cause the network device in the Clos network to receive an indication of a next-next-hop of the network device and link quality information of the next-next-hop. The set of instructions, when executed by one or more processors of the network device in the Clos network, may cause the network device in the Clos network to transmit network traffic based on the indication of the next-next-hop and the link quality information of the next-next-hop.

DETAILED DESCRIPTION

Figure 1A:
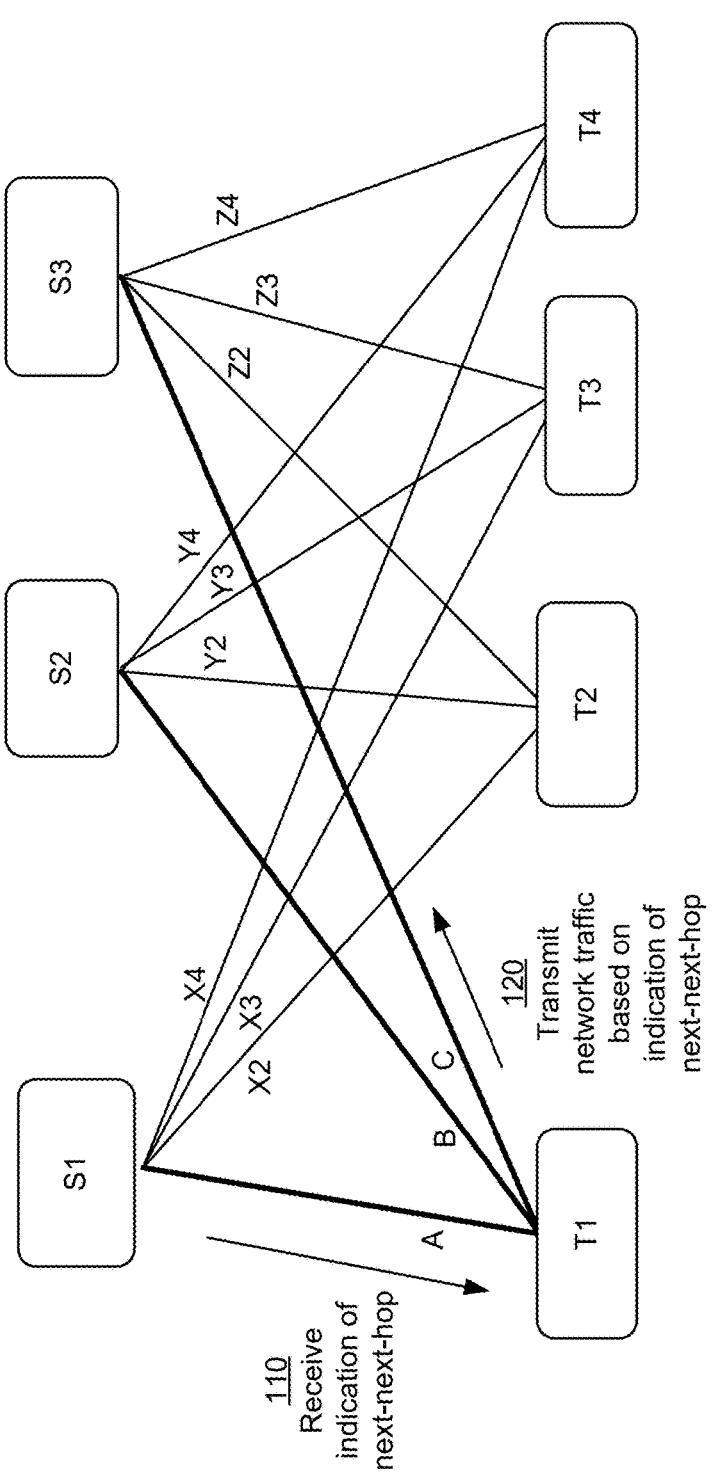
FIGS. 1A-1B are diagrams of an example implementation associated with network traffic transmission based on a next-next-hop indication.

The following detailed description of example implementations refers to the accompanying drawings. The same reference numbers in different drawings may identify the same or similar elements.

Network devices (e.g., routers, switches, or the like) can forward packets along a route having multiple next-hops by hashing packet flows to the next-hops for load balancing purposes. For example, a network device can hash packet flows into different equal-cost multi-path (ECMP) links of a route. In datacenter (DC) fabric underlay routing, network devices can use exterior border gateway protocol (EBGP) hop-by-hop routing to route packet flows. For example, network devices can use hop-by-hop EBGP underlay routing in Clos networks.

Congestion can increase packet loss and latency. For example, congestion can impact artificial intelligence (AI)/machine learning (ML) traffic, which may have strict loss and latency requirements (e.g., in accordance with service level agreements (SLAs) in a wide area network (WAN)). Uneven flow hashing can create congestion anywhere in a network fabric. For example, uneven flow hashing can create congestion in a Clos fabric, which may employ a spine-leaf architecture. If a link becomes congested due to uneven hashing, the network device for which the link is a next-hop link can use dynamic load balancing to adjust the hashing and thereby divert the packet flow(s) away from the link, which can mitigate the congestion. For example, in response to detecting congestion on a local ECMP link from a leaf node to a spine node, a leaf node may use dynamic load balancing to hash packet flows to alternate ECMP links on the leaf node, which may mitigate the congestion. In this example, the congestion is local to the leaf node because the congestion is on a next-hop link of the leaf node.

Many instances of link congestions cannot be addressed using dynamic load balancing. For example, if all of the next-hop link(s) of a network device are congested, then dynamic load balancing cannot help the network device to mitigate the congestion. For example, if congestion occurs on a remote link from a spine node to a first leaf node, then dynamic load balancing on the spine nodes cannot help to mitigate the congestion because the spine node does not have any alternative links to reach the leaf node. In this example, other leaf nodes hash packet flows to alternative spine nodes to mitigate the link congestion.

Some implementations described herein enable a network device to transmit network traffic based on a next-next-hop of the network device. For example, the network device may determine that a link quality of a next-next-hop is poor (e.g., the next-next-hop is congested) and steer network traffic away from a next-hop that can forward traffic to the next-next-hop. For example, the network device may use the combined link quality of each next-hop, and the next-next-hops corresponding to each of the next-hops, as feedback for dynamic load balancing. In some examples, the network device may transmit the network traffic in a Clos network.

The network device may use a non-link-state protocol, such as BGP, to advertise and calculate topology information (e.g., network layer reachability information (NLRI), such as next-next-hop information). In some examples, the network device (e.g., a BGP speaker) may discover the next-next-hop information of BGP routes using an NNHN capability in a next hop dependent capabilities attribute (NHC). For example, the next-next-hop information may be encoded as a capability type-length-value (TLV) in the NHC. In some examples, the network device may discover the next-next-hop information of BGP routes using an autonomous system (AS) path attribute. The NHC and/or the AS path attribute may be attributes in a BGP update message received by the network device.

As a result, a network device may detect and mitigate remote congestion on a next-next-hop link, which may be referred to as global load balancing (GLB). For example, the next-next-hop information may enable the network device to determine how the remote congestion is to affect local load balancing decisions (e.g., dynamic load balancing) of the network device. For example, the network device may use GLB to mitigate congestion on a next-next-hop link by shifting traffic to alternative nodes. Thus, GLB may reduce the amount of bandwidth occupied due to congestion on the network fabric, thereby reducing packet loss and latency and/or enabling the network fabric to meet SLAs.

GLB in Clos networks may reduce overhead because a network device in a Clos network may perform GLB based on the next-hop and next-next-hop of the network device (e.g., without using information for any further hops of the network device). As a result, the Clos network may avoid transmission of indications of any hops beyond the next-next-hop and/or link quality information for hops beyond the next-next-hop. For example, to achieve GLB, each node in a Clos network may track, for each route, the next-hops and the next-next-hops (e.g., only the next-hops and the next-next-hops) of the node, and/or the link congestion status of the next-hops and the next-next-hops (e.g., only the next-hops and the next-next-hops). For example, a node may flood link quality information toward direct neighbors of the node without propagating link quality information beyond the direct neighbors, thereby avoiding scaling issues (e.g., scaling issues that are present in, for example, interior gateway protocol (IGP) flooding).

In a Clos network, congestion on links beyond the next-next-hop does not affect GLB because only the first two hops (e.g., a next-hop and a next-next-hop) of a given route are needed for GLB. For example, due to the topology (e.g., design) of Clos networks, link congestion may affect the load balancing decisions of a node experiencing the link congestion and any previous-hop nodes (e.g., only the node and previous-hop node(s)). The link congestion may affect the load balancing decisions of all previous layer nodes equally, and as a result, any previous-previous-hops (e.g., nodes on a previous-previous layer of the Clos network) may refrain from attempting to mitigate the link congestion by changing load balancing decisions for traffic forwarded toward previous-hop nodes (e.g., nodes on a previous layer of the Clos network).

Extensions to non-link-state protocols, such as BGP, may enable a network device (e.g., a BGP speaker) to achieve GLB by determining a topology. In some examples, a BGP speaker may use BGP to determine NLRI, such as the next-hops and the next-next-hops of the BGP speaker. Based on the NLRI, the BGP speaker may make optimal forwarding decisions that mitigate remote congestion on the next-next-hop link. The NNHC capability may enable the network device to receive next-next-hop information for multiple next-next-hops of a next-hop. The AS path attribute may avoid introducing additional overhead to BGP.

Figure 1B:
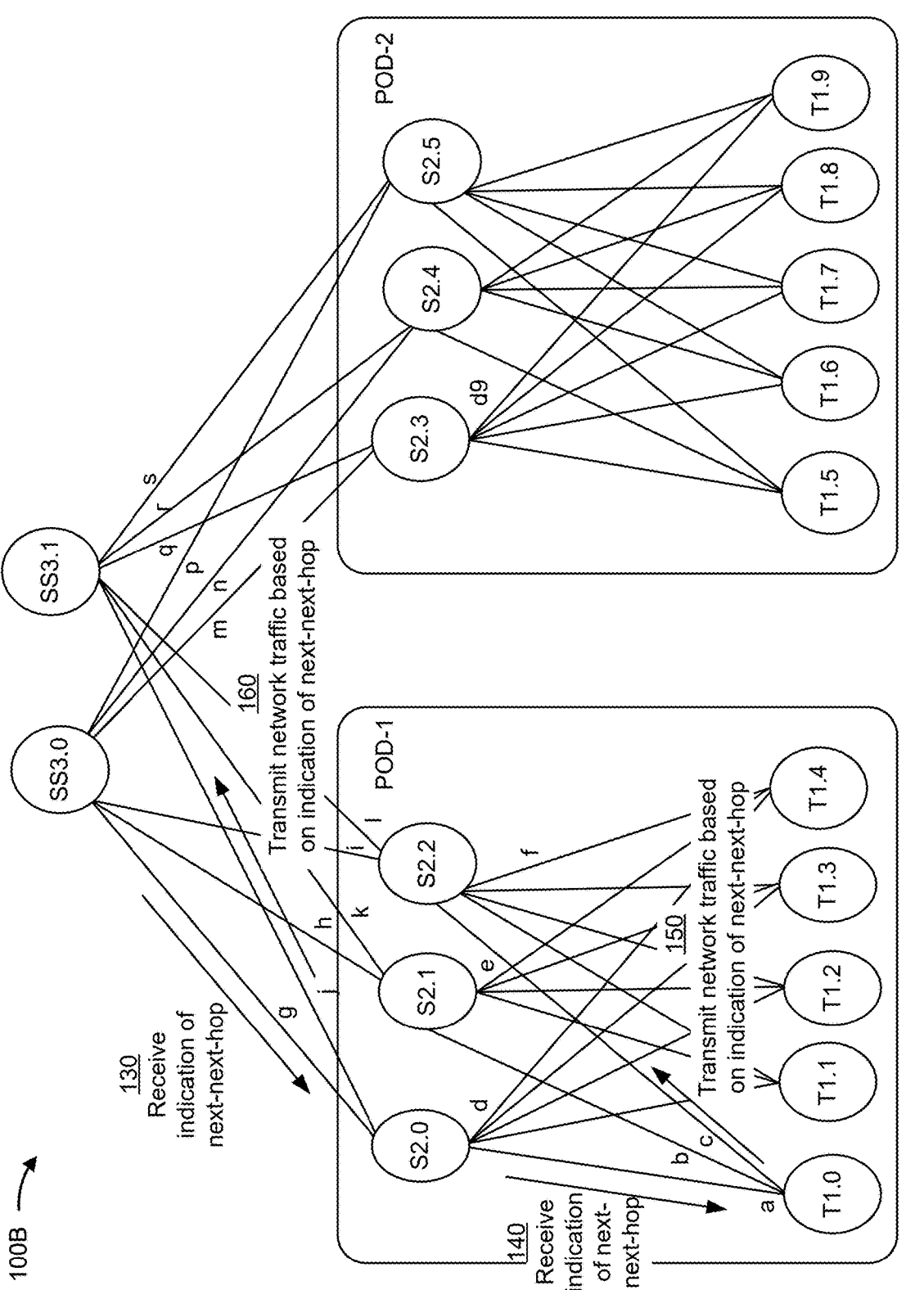

FIGS. 1A-1B are diagrams of an example implementation 100 associated with network traffic transmission based on a next-next-hop indication. As shown in FIGS. 1A-1B, example implementations 100A and 100B include a plurality of network devices (e.g., nodes) arranged in a plurality of levels in a Clos network. These network devices are described in more detail below in connection with FIGS. 3-5.

Example implementation 100A involves a three-stage Clos network that employs a spine-leaf architecture. The three-stage Clos network includes two layers of network devices. One layer includes spine nodes S1-S3 and the other layer includes leaf nodes T1-T4. As shown, each spine node may communicate with each leaf node, and each leaf node may communicate with each spine node, over respective links. For example, leaf nodes T1-T4 may forward packets to each other over the links via spine nodes S1-S3. Leaf nodes T1-T4 and spine nodes S1-S3 may be BGP speakers.

Leaf nodes T1-T4 and spine nodes S1-S3 may advertise routing information to each other, which may enable forwarding of packets within the three-stage Clos network. For example, leaf nodes T1-T4 may transmit, to each of spine nodes S1-S3, indications that leaf nodes T1-T4 are next-hops for spine nodes S1-S3. For example, leaf nodes T2-T4 may transmit, to spine node S1, indications that leaf nodes T2-T4 are next-hops for spine nodes S1. In response to receiving the indications that leaf nodes T2-T4 are next-hops for spine nodes S1-S3, spine nodes S1-S3 may transmit, to leaf nodes T1-T4, indications that spine nodes S1-S3 are next-hops for leaf nodes T1-T4 and that leaf nodes T1-T4 are next-next-hops for others of leaf nodes T1-T4. For example, spine node S1 may transmit, to leaf node T1, an indication of a next-next-hop of leaf node T1.

As shown by reference number 110, leaf node T1 may receive, from spine node S1, the indication of a next-next-hop of leaf node T1. Additionally, or alternatively, leaf node T1 may also receive an indication of a next-hop of leaf node T1. For example, leaf node T1 may receive, from spine node S1, an indication that spine node S1 is a next-hop for leaf node T1.

Table 1 below shows the next-hop and the next-next-hop for routes on leaf node T1. For example, the three-stage Clos network may provide three possible routes from leaf node T1 to leaf node T2: a first route via next-hop A and next-next-hop X2; a second route via next-hop B and next-next-hop Y2; and a third route via next-hop C and next-next-hop Z2. The three-stage Clos network may provide three possible routes from leaf node T1 to leaf node T3: a first route via next-hop A and next-next-hop X3; a second route via next-hop B and next-next-hop Y3; and a third route via next-hop C and next-next-hop Z3. The three-stage Clos network may provide three possible routes from leaf node T1 to leaf node T4: a first route via next-hop A and next-next-hop X4; a second route via next-hop B and next-next-hop Y4; and a third route via next-hop C and next-next-hop Z4.

TABLE 1

| Destination | Next-hop | Next-next-hop |
| --- | --- | --- |
| T2 | A | X2 |
| | B | Y2 |
| | C | Z2 |
| T3 | A | X3 |
| | B | Y3 |
| | C | Z3 |

TABLE 1-continued

| Destination | Next-hop | Next-next-hop |
| --- | --- | --- |
| T4 | A | X4 |
| | B | Y4 |
| | C | Z4 |

In some examples, leaf node T1 may receive the indication of the next-next-hop via a link state protocol. In a link state protocol, each node in a network may use a graph of connections between the nodes in the network to calculate optimal paths from the node to every other destination in the network. Examples of link state protocols may include open shortest path first (OSFP), intermediate system to intermediate system (IS-IS), IGP, routing in fat trees (RIFT) protocol, or the like. Leaf node T1 may use the link state protocol to calculate next-next-hop information and/or to advertise link quality.

In some aspects, leaf node T1 may receive the indication of the next-next-hop via a non-link state protocol, such as a distance-vector routing protocol. In a distance-vector routing protocol, each node in a network may use a quantity of hops (e.g., a "distance") that a packet would traverse to determine an optimal path for the packet. Examples of non-link state protocols may include BGP, routing information protocol (RIP), interior gateway routing protocol (IGRP), or the like.

In some aspects, the non-link-state routing protocol may be BGP. BGP may be an exterior gateway protocol that enables nodes to exchange routing information. Examples of BGP may include interior BGP (iBGP), exterior BGP (eBGP), or the like. In some aspects, leaf node T1 may receive a BGP update message that contains the indication of the next-next-hop. A BGP update message may carry, between nodes, routing information that updates a route. The BGP update message may carry an attribute that conveys the next-next-hop of a node (e.g., leaf node T1). The leaf node T1 may receive the BGP update message in response to a change in topology and/or configuration (e.g., when a configuration for performing GLB is activated).

In some aspects, the indication of the next-next-hop is a BGP identifier in an NNHN capability of the BGP update message. For example, the leaf node T1 may discover one or more next-hops and/or next-next-hops using the BGP update message. Thus, the NNHN capability may enable topology discovery (e.g., discovery of a next-next-hop).

In some aspects, the BGP update message may be associated with an eBGP session. For example, leaf node T1 may receive the BGP update message over one or more eBGP sessions. Leaf node T1 may use eBGP to discover the topology of the three-stage Clos network based on the NNHN capability.

In some aspects, next-help self may be configured for the eBGP session. For example, spine node S1 may advertise one or more routes to leaf node T1 over an eBGP session with next-hop self activated. For example, in addition to identifying leaf nodes T2-T4 as next-next-hops for leaf node T1, spine node S1 may also identify spine node S1 as a next-hop for leaf node T1.

In some aspects, the NNHN capability may include a plurality of BGP identifiers that correspond to a plurality of next-next-hops of leaf node T1. For example, the BGP identifiers may correspond to leaf nodes T2-T4. In some examples, the NNHN capability may carry downstream BGP identifiers of all ECMP links that correspond to a next-next-hop of leaf node T1.

In some aspects, the BGP update message may further contain an indication of a next-hop, of leaf node T1, that is associated with the next-next-hop. For example, the BGP update message may indicate that, for a route from leaf node T1 to another of the leaf nodes, spine node S1 is the next-hop associated with the next-next-hop(s) for that route. For example, the leaf node T1 may receive an indication of a prefix with the next-hop and the next-next-hop and associate the next-next-hop information to the corresponding next-hop.

In some aspects, the indication of the next-next-hop may be an AS number in an AS path attribute of the BGP update message. For example, leaf node T1 may retrieve the next-next-hop via a BGP AS path attribute and discover the topology of the three-stage Clos network (e.g., the next-hop and/or the next-next-hop) using the BGP AS path attribute. For three-stage Clos networks, the second AS number in the AS path attribute may represent the next-next-hop. The BGP AS path attribute may be used in cases where the NNHN is not available.

In some aspects, leaf nodes T1-T4 and spine nodes S1-S3 may be arranged in in a Clos network (e.g., a three-stage Clos network). For example, as shown, leaf nodes T1-T4 may be in a first level of the three-stage Clos network, and the spine nodes S1-S3 may be in a second level of the three-stage Clos network. Each leaf node T1-T4 and spine node S1-S3 may be associated with an AS number that is unique within the Clos network. For example, no two nodes may share the same AS number. Thus, in cases where the AS path attribute is used to identify next-next-hops, each node in the Clos network may have an AS number unique to the Clos network.

Based on the indication of the next-next-hop (e.g., received via a BGP update message), leaf node T1 may track next-next-hop links, and/or corresponding next-hop links, for each route advertised by leaf nodes T2-T4. For example, leaf node T1 may track the information shown in Table 1 above.

Additionally, or alternatively, leaf nodes T1-T4 and/or spine nodes S1-S3 may receive and track link quality information of the next-next-hop. In some examples, leaf nodes T1-T4 and/or spine nodes S1-S3 may use AS numbers in link quality messages to associate a link quality with a hop. The link quality information may include a congestion status of any suitable link between nodes in the three-stage Clos network. In some examples, leaf nodes T1-T4 and spine nodes S1-S3 may exchange the congestion status in real-time.

In a case where link X4 (e.g., the link from spine node S1 to leaf node T4) is congested, spine node S1 may flood link quality information, indicating that link X4 is congested, to all neighboring nodes of spine node S1. For example, a packet forwarder of spine node S1 may flood the link quality information, which may be received by leaf nodes T1-T4 within milliseconds. For example, leaf node T1 may receive link quality information indicating that link X4 is congested.

As shown by reference number 120, leaf node T1 may transmit network traffic based on the indication of the next-next-hop. For example, leaf node T1 may transmit network traffic destined to leaf node T4 based on leaf node T4 being a next-next-hop for the route followed by the network traffic. In some examples, leaf node T1 may also transmit the network traffic based on the link quality information (e.g., based on the indication that link X4 is congested). In some aspects, leaf node T1 may transmit the network traffic based on the next-hop (e.g., spine node S1) being associated with the next-next-hop (e.g., leaf node T4).

For example, leaf node T1 may use the link qualities of <next-hop, next-next-hop> tuples (e.g., link qualities of an <S1, T4> tuple) to make the load balancing decisions. For example, leaf node T1 in response to determining that link X4 is congested, leaf node T1 may avoid hashing network traffic (e.g., packet flows) over link A to spine node S1. For example, leaf node T1 may transmit network traffic over link B to spine node S2, which may forward the network traffic over link Y4 to leaf node T4. Additionally, or alternatively, leaf node T1 may transmit network traffic over link C to spine node S3, which may forward the network traffic over link Z4 to leaf node T4. Avoiding hashing network traffic to spine node S1 may enable spine node S1 to avoid forwarding network traffic over link X4, thereby mitigating congestion on link X4 using GLB.

Although some examples described herein are discussed with respect to leaf node T1, implementations provided herein may be applied to any suitable network device. For example, any of leaf nodes T1-T4, and/or any of spine nodes S1-S3, may perform any suitable operations that are similar to the operations described above as being performed by leaf node T1. For example, any of leaf nodes T1-T4 may receive an indication of a next-next-hop and/or transmit network traffic based on the indication of the next-next-hop as described above with reference to leaf node T1. Additionally, or alternatively, any of spine nodes S1-S3 may transmit (e.g., to any of leaf nodes T1-T4) an indication of a next-next-hop.

With reference to FIG. 1B, example implementation 100B involves a five-stage Clos network that employs a spine-leaf architecture. The five-stage Clos network includes three layers of network devices. One layer includes leaf nodes T1.0-T1.9, another layer includes spine nodes S2.0-S2.5, and another layer includes superspine nodes SS3.0 and SS3.1. Leaf nodes T1.0-T1.4 belong to a first pod ("POD-1"), and leaf nodes T1.5-T1.9 belong to a second pod ("POD-2").

As shown, each leaf node may communicate with each spine node, and each leaf node may communicate with each leaf node, over respective links. Furthermore, each spine node may communicate with each superspine node, and each superspine node may communicate with each spine node, over respective links. For example, leaf nodes T1.0-T1.9 may forward packets to each other over the links via spine nodes S2.0-S2.5 and via superspine nodes SS3.0 and SS3.1. Leaf nodes T1.0-T1.9, spine nodes S2.0-S2.5, and superspine nodes SS3.0 and SS3.1 may be BGP speakers.

Unlike the three-stage Clos network shown in FIG. 1A, where next-next-hops may exist only on leaf nodes, the five-stage Clos network may include next-next-hops on spine nodes and superspine nodes. For routes advertised by leaf nodes in the same pod as the leaf node that receives the advertisement (e.g., for a route advertised by leaf node T1.0 and received at leaf node T1.1 or leaf node T1.2), GLB may be performed in a similar manner as described above in connection with the three-stage Clos network shown in FIG. 1A. For routes advertised by leaf nodes in a different pod than the leaf node that receives the advertisement (e.g., for a route advertised by leaf node T1.9 and received at leaf node T1.0), the nodes in the five-stage Clos network may perform GLB by tracking the next-hop and/or next-next-hop (e.g., only the next-hop and/or next-next-hop).

Leaf nodes T1.0-T1.9, spine nodes S2.0-S2.5, and superspine nodes SS3.0 and SS3.1 may advertise routing information to each other, which may enable forwarding of packets within the five-stage Clos network. For example, the leaf nodes T1.0-T1.9, spine nodes S2.0-S2.5, and superspine nodes SS3.0 and SS3.1 may transmit and/or receive indications of next-next-hops of the nodes. In some aspects, the nodes may receive an indication of a next-next-hop and transmit, based on the indication of the next-next-hop, another indication that does not contain an indication of the next-next-hop. For example, spine nodes S2.0-S2.5 and/or superspine nodes SS3.0 and SS3.1 may transmit, based on a BGP update message that contains an NNHN capability, another BGP update message that does not contain the NNHN capability. Thus, next-next-hop information may be consumed by the node that receives the next-next-hop information, and that node may refrain from further propagating the next-next-hop information.

For example, leaf nodes T1.0-T1.9 may transmit, to each of spine nodes S2.0-S2.5, indications that leaf nodes T1.0-T1.9 are next-hops for spine nodes S2.0-S2.5. Spine nodes S2.0-S2.5 may transmit, to each of superspine nodes SS3.0 and SS3.1, indications that spine nodes S2.0-S2.5 are next-hops for superspine nodes SS3.0 and SS3.1 and that leaf nodes T1.0-T1.9 are next-next-hops for superspine nodes SS3.0 and SS3.1. Superspine nodes SS3.0 and SS3.1 may transmit, to each of spine nodes S2.0-S2.5, indications that superspine nodes SS3.0 and SS3.1 are next-hops for spine nodes S2.0-S2.5 and that others of spine nodes S2.0-S2.5 are next-next-hops for spine nodes S2.0-S2.5. Spine nodes S2.0-S2.5 may transmit, to each of leaf nodes T1.0-T1.9, indications that spine nodes S2.0-S2.5 are next-hops for leaf nodes T1.0-T1.9 and that superspine nodes SS3.0 and SS3.1 are next-next-hops for leaf nodes T1.0-T1.9.

For example, leaf nodes T1.5-T1.9 may transmit, to spine nodes S2.3-S2.5, indications that leaf nodes T1.5-T1.9 are next-hops for spine nodes S2.3-S2.5. For example, leaf node T1.9 may transmit, to spine nodes S2.3-S2.5, indications that leaf node T1.9 is a next-hop for spine nodes S2.3-S2.5. In response to receiving the indications that leaf node T1.9 is a next-hop for spine nodes S2.3-S2.5, spine nodes S2.3-S2.5 may transmit, to superspine nodes SS3.0 and SS3.1, indications that spine nodes S2.3-S2.5 are next-hops for superspine nodes SS3.0 and SS3.1 and that leaf nodes T1.5-T1.9 are next-next-hops for superspine nodes SS3.0 and SS3.1. For example, spine node S2.3 may transmit, to superspine node SS3.0, an indication that spine node S2.3 is a next-hop for superspine node SS3.0 and that leaf node T1.9 is a next-next-hop for superspine node SS3.0 and SS3.1. Superspine nodes SS3.0 and SS3.1 may transmit, to each of spine nodes S2.0-S2.2, indications that superspine nodes SS3.0 and SS3.1 are next-hops for spine nodes S2.0-S2.2 and that spine nodes S2.3-S2.5 are next-next-hops for spine nodes S2.0-S2.2. For example, superspine node SS3.0 may transmit, to spine node S2.0, an indication that superspine node SS3.0 is a next-hop for spine node S2.0 and that spine node S2.3 is a next-next-hops for spine node S2.0. Spine nodes S2.0-S2.2 may transmit, to leaf nodes T1.0-T1.4, indications that spine nodes S2.0-S2.2 are next-hops for leaf nodes T1.0-T1.4 and that superspine nodes SS3.0 and SS3.1 are next-next-hops for leaf nodes T1.0-T1.4. For example, spine node S2.0 may transmit, to leaf node T1.0, an indication that spine node S2.0 is a next-hop of leaf node T1.0 and that superspine node SS3.0 is a next-next-hop of leaf node T1.0.

As shown by reference number 130, spine node S2.0 may receive, from superspine node SS3.0, the indication of a next-next-hop of spine node S2.0. In some examples, spine node S2.0 may receive an indication of a plurality of the next-next-hops (e.g., spine nodes S2.3-S2.5). Additionally, or alternatively, spine node S2.0 may receive an indication of a next-hop of spine node S2.0. For example, spine node S2.0 may receive, from superspine node SS3.0, an indication that superspine node SS3.0 is a next-hop for spine node S2.0.

Table 2 below shows the next-hop and the next-next-hop for routes on spine node S2.0. For example, network traffic forwarded from spine node S2.0 and destined to leaf nodes T1.7-T1.9 may traverse link g and then links m, n, or p or link j and then links q, r, or s.

TABLE 2

| Destination | Next-hop | Next-next-hop |
|---|---|---|
| T1.7 | g | m, n, p |
| | j | q, r, s |
| T1.8 | g | m, n, p |
| | j | q, r, s |
| T1.9 | g | m, n, p |
| | j | q, r, s |

As shown by reference number 140, leaf node T1.0 may receive, from spine node S2.0, the indication of a next-next-hop of leaf node T1.0. In some examples, leaf node T1.0 may receive an indication of a plurality of the next-next-hops (e.g., superspine nodes SS3.0 and SS3.1). Additionally, or alternatively, leaf node T1.0 may receive an indication of a next-hop of leaf node T1.0. For example, leaf node S1.0 may receive, from spine node S2.0, an indication that spine node S2.0 is a next-hop for leaf node S1.0.

Table 3 below shows the next-hop and the next-next-hop for routes on leaf node T1.0. For example, network traffic forwarded from leaf node T1.0 and destined to leaf node T1.4 may traverse link a and then link d, link b and then link e, or link c and then link f. Network traffic forwarded from leaf node T1.0 and destined to leaf nodes T1.8 or T1.9 may traverse link a and then links g or j, link b and then links h or k, or link c and then links i or 1.

TABLE 3

| Destination | Next-hop | Next-next-hop |
|---|---|---|
| T1.4 | a | d |
| | b | e |
| | c | f |
| T1.8 | a | g, j |
| | b | h, k |
| | c | i, l |
| T1.9 | a | g, j |
| | b | h, k |
| | c | i, l |

In some examples, spine node S2.0 and/or leaf node T1.0 may receive the indications of the next-next-hops via a link state protocol. Spine node S2.0 and/or leaf node T1.0 may use the link state protocol to calculate next-next-hop information and/or to advertise link quality. In some aspects, spine node S2.0 and/or leaf node T1.0 may receive the indication of the next-next-hop via a non-link state protocol, such as a distance-vector routing protocol.

In some aspects, the non-link-state routing protocol may be BGP. In some aspects, spine node S2.0 and/or leaf node T1.0 may receive a BGP update message that contains the indication of the next-next-hop. The BGP update message may carry an attribute that conveys the next-next-hop of a node. For example, a BGP message received by spine node S2.0 may indicate that spine nodes S2.3-S2.5 are next-next-hops of spine node 2.0. The BGP update message received by leaf node T1.0 may carry an indication that superspine nodes SS3.0 and/or SS3.1 are next-next-hops of leaf node T1.0 Spine node S2.0 and/or leaf node T1.0 may receive the BGP update messages in response to a change in topology and/or configuration (e.g., when a configuration for performing GLB is activated).

In some aspects, the indication of the next-next-hop may be a BGP identifier in an NNHN capability of a BGP update message. For example, the spine node S2.0 may discover one or more next-hops and/or next-next-hops using the BGP update message received by spine node S2.0. Leaf node T1.0 may discover one or more next-hops and/or next-next-hops using the BGP update message received by leaf node T1.0. Thus, the NNHN capability may enable topology discovery (e.g., discovery of a next-next-hop).

In some aspects, the BGP update message may be associated with an eBGP session. For example, spine node S2.0 and/or leaf node T1.0 may receive the BGP update message over one or more eBGP sessions. Spine node S2.0 and/or leaf node T1.0 may use eBGP to discover the topology of the five-stage Clos network based on the NNHN capability.

In some aspects, next-help self may be configured for the eBGP session. For example, superspine nodes SS3.0 and/or SS3.1 may advertise one or more routes to spine node S2.0 over an eBGP session with next-hop self. For example, in addition to identifying spine nodes S2.3-S2.5 as next-next-hops for spine node S2.0, superspine nodes SS3.0 and/or SS3.1 may also identify superspine nodes SS3.0 and/or SS3.1 as a next-hop for spine node S2.0. Additionally, or alternatively, spine node S2.0 may advertise one or more routes to leaf node T1.0 over an eBGP session with next-hop self. For example, in addition to identifying superspine nodes SS3.0 and/or SS3.1 as next-next-hops for leaf node T1.0, spine node S2.0 may also identify spine node S2.0 as a next-hop for leaf node T1.0.

In some aspects, the NNHN capability may include a plurality of BGP identifiers that correspond to a plurality of next-next-hops of spine node S2.0 and/or leaf node T1.0. For example, the BGP identifiers of the BGP update message received by spine node S2.0 may correspond to spine nodes S2.3-S2.5. Additionally, or alternatively, the BGP identifiers of the BGP update message received by leaf node T1.0 may correspond to superspine nodes SS3.0 and/or SS3.1. In some examples, the NNHN capability may carry downstream BGP identifiers of all ECMP links that correspond to next-next-hops of spine node S2.0 and/or leaf node T1.0.

In some aspects, the BGP update message may further contain an indication of a next-hop that is associated with the next-next-hop. For example, the BGP update message received by spine node S2.0 may indicate that, for a route to leaf nodes T1.5-T1.9, superspine nodes SS3.0 and/or SS3.1 are the next-hops associated with the next-next-hop(s) for that route. Additionally, or alternatively, the BGP update message received by leaf node T1.0 may indicate that, for a route to leaf nodes T1.5-T1.9, spine nodes S2.0-S2.2 are the next-hops associated with the next-next-hop(s) for that route. For example, spine node S2.0 and/or leaf node T1 may receive an indication of a prefix with the next-hop and the next-next-hop and associate the next-next-hop information to the corresponding next-hop.

In some aspects, the indication of the next-next-hop may be an AS number in an AS path attribute of the BGP update message. For example, spine node S2.0 and/or leaf node T1.0 may retrieve a next-next-hop via a BGP AS path attribute and discover the topology of the five-stage Clos network (e.g., the next-hop and/or the next-next-hop) using the BGP AS path attribute. Because each next-hop may have multiple next-next-hops in a five-stage Clos network, the AS path attribute may include an AS number of the next-nexthop for the active path (e.g., only the next-next-hop AS number of the next-next-hop for the active path), and other next-next-hop AS numbers may be included in an AS set attribute. The BGP AS path attribute may be used in cases where the NNHN capability is not available.

In some aspects, leaf nodes T1.0-T1.9, spine nodes S2.0-S2.5, and superspine nodes SS3.0 and SS3.1 may be arranged in a Clos network (e.g., a five-stage Clos network). For example, as shown, leaf nodes T1.0-T1.9 may be in a first level of the five-stage Clos network, spine nodes S2.0-S2.5 may be in a second level of the five-stage Clos network, and superspine nodes SS3.0 and SS3.1 may be in a third level of the five-stage Clos network. Each leaf node T1.0-T1.9, spine nodes S2.0-S2.5, and superspine nodes SS3.0 and SS3.1 may be associated with an AS number that is unique within the Clos network. For example, no two nodes in the Clos network may share the same AS number. Thus, in cases where the AS path attribute is used to identify next-next-hops, each node in the Clos network may have an AS number unique to the Clos network.

Based on the indication of the next-next-hop (e.g., received via a BGP update message), spine node S2.0 and/or leaf node T1.0 may track next-next-hop links, and/or corresponding next-hop links, for each route advertised by leaf nodes T1.0-T1.9. For example, spine node S2.0 and leaf node T1.0 may track the information shown in Tables 2 and 3 above, respectively.

Additionally, or alternatively, leaf nodes T1.0-T1.9, spine nodes S2.0-S2.5, and/or superspine nodes SS3.0 and SS3.1 may receive and track link quality information of the next-next-hop. In some examples, leaf nodes T1.0-T1.9, spine nodes S2.0-S2.5, and/or superspine nodes SS3.0 and SS3.1 may use AS numbers in link quality messages to associate a link quality with a hop. The link quality information may include a congestion status of any suitable link between nodes in the five-stage Clos network. In some examples, leaf nodes T1.0-T1.9, spine nodes S2.0-S2.5, and/or superspine nodes SS3.0 and SS3.1 may exchange the congestion status in real-time.

In a case where link m (e.g., the link from superspine node SS3.0 to spine node S2.3) is congested, superspine node SS3.0 may flood link quality information, indicating that link m is congested, to all neighboring nodes of superspine node SS3.0. For example, a packet forwarder of superspine node SS3.0 may flood the link quality information, which may be received by spine nodes S2.0-2.5 within milliseconds. For example, spine node S2.0 may receive link quality information indicating that link m is congested.

In a case where link g (e.g., the link from leaf node T1.0 to spine node S2.0) is congested, spine node S2.0 may flood link quality information, indicating that link g is congested, to all neighboring nodes of spine node S2.0. For example, a packet forwarder of spine node S2.0 may flood the link quality information, which may be received by leaf nodes T1.0-T1.4 within milliseconds. For example, leaf node T1.0 may receive link quality information indicating that link g is congested.

As shown by reference number 150, leaf node T1.0 may transmit network traffic based on the indication of the next-next-hop. For example, leaf node T1.0 may transmit network traffic destined to any of leaf nodes T1.5-T1.9 based on superspine node SS3.0 being a next-next-hop for the route followed by the network traffic. In some examples, leaf node T1.0 may also transmit the network traffic based on the link quality information (e.g., based on the indication that link g is congested). In some aspects, leaf node T1.0 may transmit the network traffic based on the next-hop (e.g., spine node S2.0) being associated with the next-next-hop (e.g., superspine node SS3.0).

For example, leaf node T1.0 may use the link qualities of <next-hop, next-next-hop> tuples (e.g., link qualities of an <S2.0, SS3.0> tuple) to make the load balancing decisions. For example, in response to determining that link g is congested, leaf node T1.0 may avoid hashing network traffic (e.g., packet flows) over link a to spine node S2.0. For example, leaf node T1.0 may transmit network traffic over link b to spine node S2.1 and/or over link c to spine node S2.2. Avoiding hashing network traffic to spine node S2.0 may enable spine node S2.0 to avoid forwarding network traffic over link g, thereby mitigating congestion on link g using GLB. In some examples, the congestion status of link m (or any other hops beyond a next-next-hop) may not affect how leaf node T1.0 hashes packet flows to spine nodes S2.0-S2.2 because the congestion status of link m (for example) affects the load balancing decisions of spine nodes S2.0-S2.2 equally.

As shown by reference number 160, spine node S2.0 may transmit network traffic based on the indication of the next-next-hop. For example, spine node S2.0 may transmit network traffic destined to any of leaf nodes T1.5-T1.9 based on spine node S2.3 being a next-next-hop for the route followed by the network traffic. In some examples, spine node S2.0 may also transmit the network traffic based on the link quality information (e.g., based on the indication that link m is congested). In some aspects, spine node S2.0 may transmit the network traffic based on the next-hop (e.g., superspine node SS3.0) being associated with the next-next-hop (e.g., spine node S2.3).

For example, spine node S2.0 may use the link qualities of <next-hop, next-next-hop> tuples (e.g., link qualities of an <SS3.0, S2.3> tuple) to make the load balancing decisions. For example, in response to determining that link m is congested, spine node S2.0 may avoid hashing network traffic (e.g., packet flows) over link g to superspine node SS3.0. For example, spine node S2.0 may transmit network traffic over link i to superspine node SS3.1. Avoiding hashing network traffic to superspine node SS3.0 may enable superspine node SS3.0 to avoid forwarding network traffic over link m, thereby mitigating congestion on link m using GLB. In some examples, the congestion status of link d9 (or any other hops beyond a next-next-hop) may not affect how spine node S2.0 hashes packet flows to superspine nodes SS3.0 and SS3.1 because the congestion status of link d9 (for example) affects the load balancing decisions of superspine nodes SS3.0 and SS3.1 equally.

Although some examples described herein are discussed with respect to leaf node T1.0 and spine node 2.0, implementations provided herein may be applied to any suitable network device. For example, any of leaf nodes T1.0-T1.9, spine nodes S2.0-S2.5, and/or superspine nodes SS3.0 and SS3.1 may perform any suitable operations that are similar to the operations described above as being performed by leaf node T1.0 or spine node 2.0. For example, any of leaf nodes T1.0-T1.9, spine nodes S2.0-S2.5, and/or superspine nodes SS3.0 and SS3.1 may receive an indication of a next-next-hop and/or transmit network traffic based on the indication of the next-next-hop as described above with reference to leaf node T1.0 or spine node 2.0.

Transmitting network traffic based on an indication of a next-next-hop may enable a network device to detect and mitigate remote congestion on a next-next-hop link. For example, the next-next-hop information may enable the network device to determine how the remote congestion is to affect local load balancing decisions (e.g., dynamic load balancing) of the network device. For example, the network device may use GLB to mitigate congestion on a next-next-hop link by shifting traffic to alternative nodes. Thus, GLB may reduce the amount of bandwidth occupied due to congestion on the network fabric, thereby reducing packet loss and latency and/or enabling the network fabric to meet SLAs.

The non-link-state protocol being BGP may enable a network device (e.g., a BGP speaker) to achieve GLB by determining a topology. In some examples, a BGP speaker may use BGP to determine the next-hops and the next-next-hops of the BGP speaker. Based on the next-hops and corresponding next-next-hops, the BGP speaker may make optimal forwarding decisions that mitigate remote congestion on the next-next-hop link.

The indication of the next-next-hop being a BGP identifier in an NNHN capability of a BGP update message may enable the network device to receive next-next-hop information for multiple next-next-hops of a next-hop (e.g., in a five-stage Clos network). The indication of the next-next-hop being an AS number in an AS path attribute of a BGP update message may avoid introducing additional overhead to BGP (e.g., by avoiding a protocol change to BGP).

The network device being in a Clos network may reduce overhead because a network device in a Clos network may perform GLB based on the next-hop and next-next-hop of the network device (e.g., without using information for any further hops of the network device). As a result, the Clos network may avoid transmission of indications of any hops beyond the next-next-hop and/or link quality information for hops beyond the next-next-hop.

Transmitting network traffic based on a next-hop being associated with a next-next-hop may enable link qualities of the next-next-hops to be reflected in the load balancing weight of the corresponding next-hop. Transmitting, by a network device, based on the BGP update message, another BGP update message that does not contain a BGP identifier as an indication of a next-next-hop of the network device in an NNHN capability may avoid introducing any BGP protocol changes for GLB.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
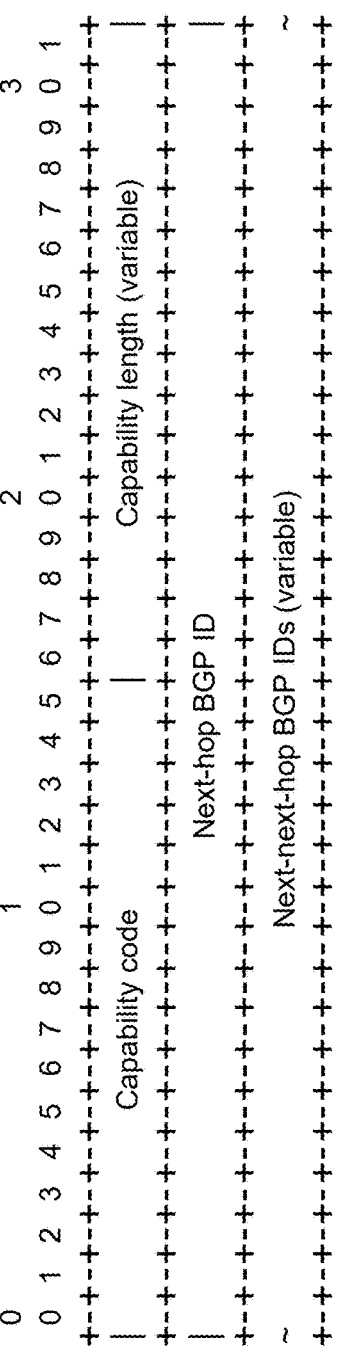
FIG. 2 is a diagram of an example implementation associated with a next-next-hop nodes (NNHN) capability of a BGP update message.

FIG. 2 is a diagram of an example implementation 200 associated with a NNHN capability of a BGP update message.

Example implementation 200 includes a format of an NNHN capability TLV. The NNHN capability includes a capability code field, a capability length, a next-hop BGP identifier field, and a next-next-hop BGP identifiers field. The capability length field may specify a remaining quantity of octets in the NNHN TLV. The next-hop BGP identifier field may include a next-hop BGP identifier, which may be a 32-bit next-hop BGP identifier of the next-hop node. The next-next-hop BGP identifiers field may include next-next-hop BGP identifier(s), which may be one or more 32-bit BGP identifiers, each representing a next-next-hop node used by the next-hop node for single path forwarding or ECMP forwarding.

The NNHN capability may be in the NHC, which may allow a BGP speaker to signal forwarding capabilities associated with a given next hop. NHC may be a container for capability TLVs, such as an NNHN capability TLV. The NNHN capability may specify the next-next-hop nodes corresponding to the next-hop field in the NHC.

Using the NNHN capability, a BGP speaker may advertise the next-next-hop nodes associated with (e.g., corresponding to) a given next-hop of an NLRI, and an upstream BGP speaker may determine the next-next-hop nodes corresponding to each of the next-hop nodes of the upstream BGP speaker. For example, if a BGP speaker S is to advertise a BGP route R with next-hop self to a peer, then the BGP speaker S may originate the NNHN capability. The next-hop BGP identifier field may be set as the BGP identifier of the BGP speaker S. For all of the paths of BGP route R that are used for forwarding (e.g., single path forwarding or ECMP forwarding), the BGP identifiers of those BGP peers may be encoded as next-next-hop BGP identifiers. If multiple paths are from the same BGP peer, then the NNHN capability may contain only one BGP identifier of that peer BGP. If the NNHN capability contains multiple next-next-hop BGP identifiers, then the next-next-hop BGP identifiers may be encoded in ascending order. An NNHN capability with no next-next-hop BGP identifiers may not be sent. In some examples, if a BGP speaker S is to advertise a BGP route R with next hop self to a peer, then the BGP speaker S may not forward the NNHN capability received from downstream peers (e.g., the BGP speaker S may either originate a NNHN capability as described above or refrain from sending any NNHN capability). If a BGP speaker S is to advertise a BGP route R to a peer with the next-hop unchanged, then the BGP speaker S may not originate the NNHN capability. However, if an NNHN capability has been received for route R and passed NHC validation, then the NNHN capability may be forwarded.

Additionally, or alternatively, the BGP speaker may use the NNHN capability to learn the next-next-hop(s) corresponding to each of the next-hops of the BGP speaker. For example, a receiver of the NNHN capability may be configured to handle any order of the next-next-hop BGP identifiers. In some example, if there are duplicated copies of BGP IDs in the next-next-hop BGP identifiers field, then the receiver may accept only the first BGP ID and ignore the remaining BGP IDs. Because the NNHN capability is carried by the NHC attribute, the NNHN capability may follow NHC attribute receiving rules.

As indicated above, FIG. 2 is provided as an example. Other examples may differ from what is described with regard to FIG. 2.

Figure 3:
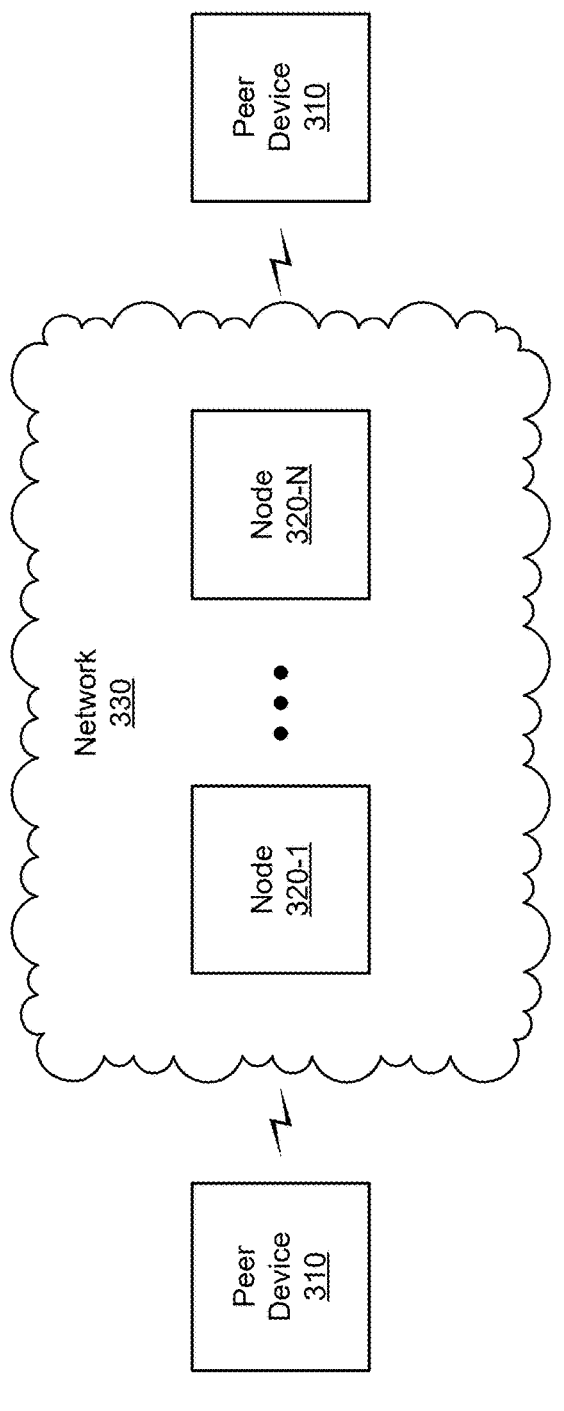
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more peer devices 310, a group of nodes 320 (shown as node 320-1 through node 320-N), and a network 330. Devices of environment 300 may interconnect via wired connections, wireless connections, or a combination of wired and wireless connections.

Peer device 310 includes one or more devices capable of receiving and/or providing network traffic. For example, peer device 310 may include a traffic transfer device, such as a router, a gateway, a switch, a firewall, a hub, a bridge, a reverse proxy, a server (e.g., a proxy server, a server executing a virtual machine, etc.), a security device, an intrusion detection device, a load balancer, or a similar type of device. In some implementations, peer device 310 may include an endpoint device that is a source or a destination for network traffic. For example, peer device 310 may include a computer or a similar type of device. Peer device 310 may receive network traffic from and/or may provide network traffic (e.g., payload packets) to other peer devices 310 via network 330 (e.g., by routing payload packets using node(s) 320 as an intermediary). In some implementations, peer device 310 may include an edge device that is located at an edge of one or more networks. For example, peer device 310 receive network traffic from and/or may provide network traffic (e.g., payload packets) to devices external to network 330.

Node 320 includes one or more devices capable of receiving, processing, storing, routing, and/or providing traffic (e.g., a payload packet, a file, etc.) in a manner described herein. For example, node 320 may include a router, such as a label switching router (LSR), a label edge router (LER), an ingress router, an egress router, a provider router (e.g., a provider edge router, a provider core router, etc.), a virtual router, or another type of router. Additionally, or alternatively, node 320 may include a gateway, a switch, a firewall, a hub, a bridge, a reverse proxy, a server (e.g., a proxy server, a cloud server, a data center server, etc.), a load balancer, and/or a similar device.

In some implementations, node 320 may be a physical device implemented within a housing, such as a chassis. In some implementations, node 320 may be a virtual device implemented by one or more computer devices of a cloud computing environment or a data center.

In some implementations, node 320 may be configured with one or more segment translation tables. In some implementations, node 320 may receive a payload packet from peer device 310. In some implementations, node 320 may encapsulate the payload packet using a compressed routing header (CRH) and may route the internet protocol (IP) payload packet to another node 320, using one or more techniques described elsewhere herein. In some implementations, node 320 may be an edge node in network 330. In some implementations, node 320 may be an intermediary node in network 330 (i.e., a node between two or more edge nodes).

Network 330 includes one or more wired and/or wireless networks. For example, network 330 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices)

of environment 300 may perform one or more functions described as being performed by another set of devices of environment 300.

Figure 4:
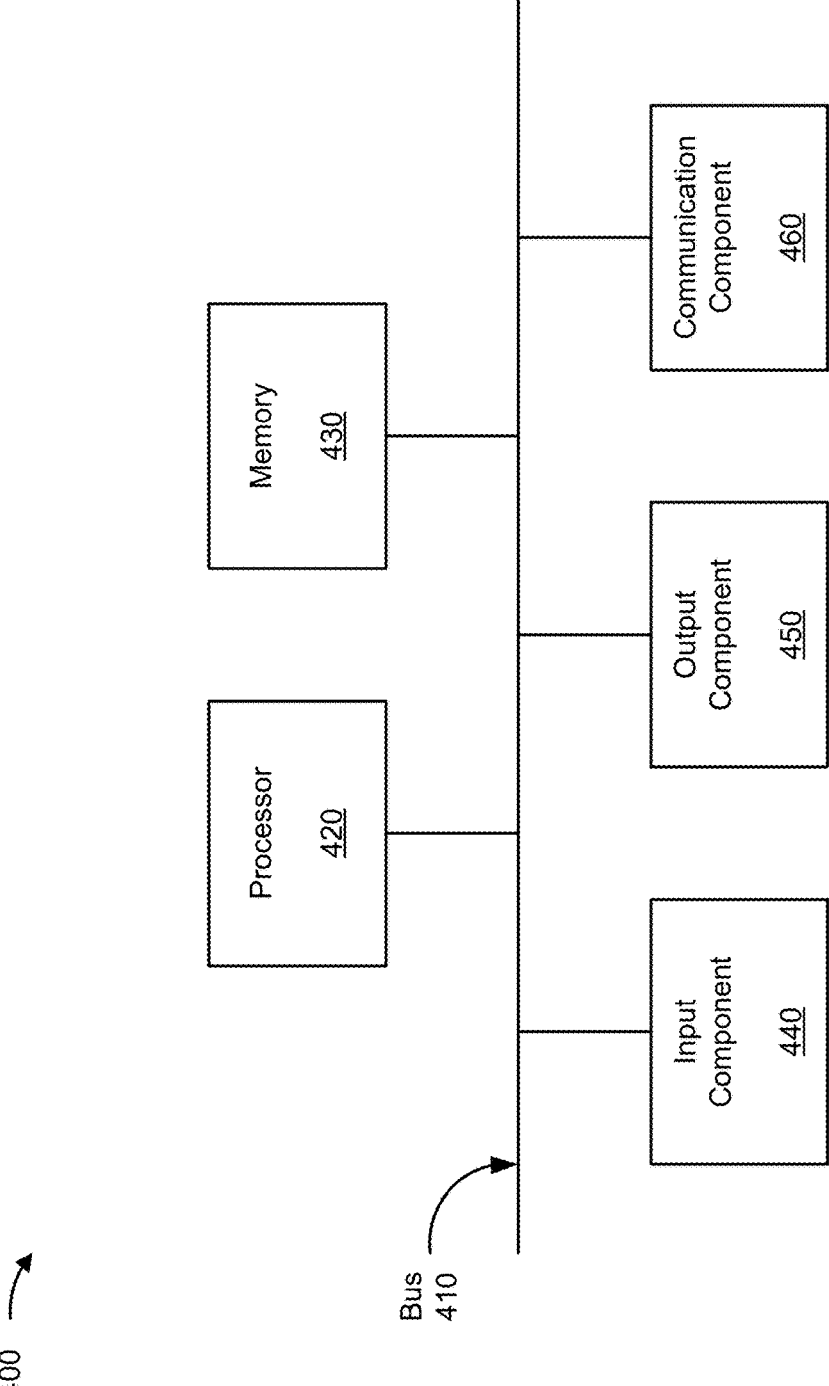
FIG. 4 is a diagram of example components of a device associated with network traffic transmission based on next-next-hop indication.

FIG. 4 is a diagram of example components of a device 400 associated with network traffic transmission based on next-next-hop indication. The device 400 may correspond to peer device 310 and/or node 320. In some implementations, peer device 310 and/or node 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
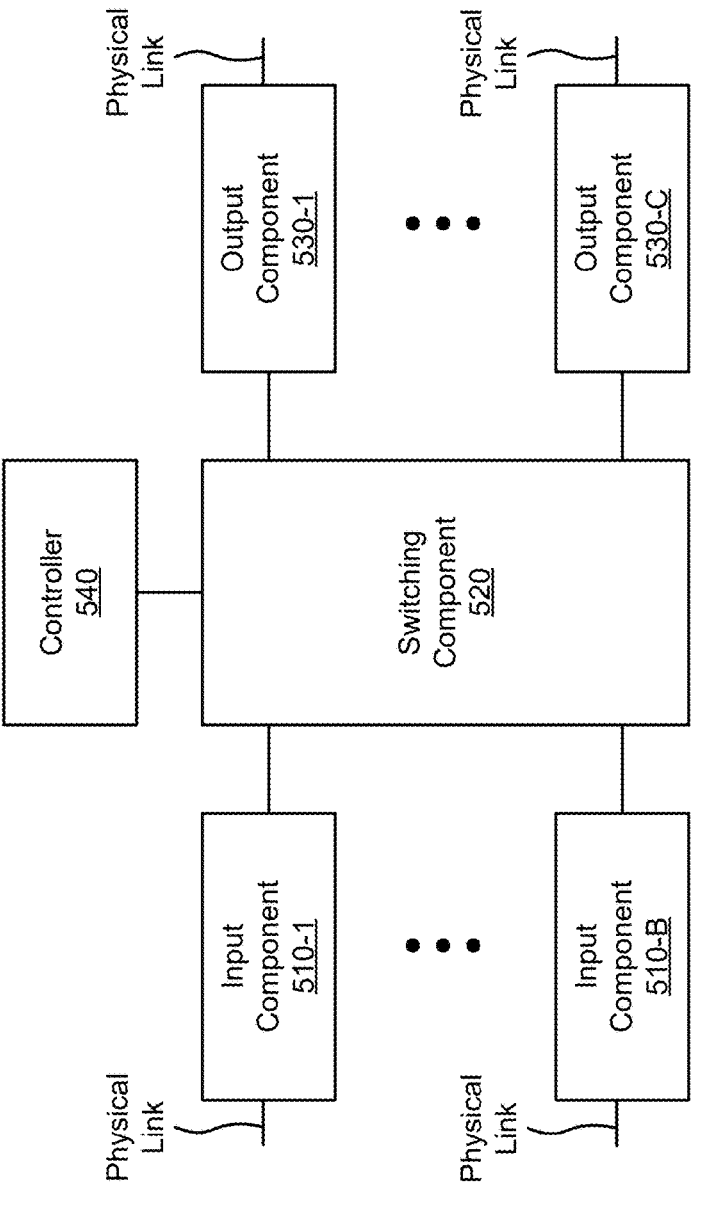
FIG. 5 is a diagram of example components of a device associated with network traffic transmission based on next-next-hop indication.

FIG. 5 is a diagram of example components of a device 500 associated with network traffic transmission based on next-next-hop indication. Device 500 may correspond to peer device 310 and/or node 320. In some implementations, peer device 310 and/or node 320 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a central processing unit (CPU), a graphics processing unit (GPU), an accelerated processing unit (APU), a microprocessor, a microcontroller, a digital signal processor (DSP), an field-programmable gate array (FPGA), an application-specific integrated circuit (ASIC), and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
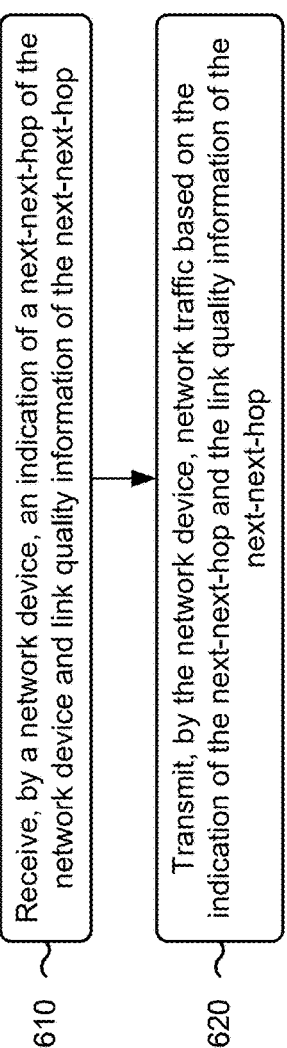
FIG. 6 is a flowchart of an example process associated with network traffic transmission based on next-next-hop indication.

FIG. 6 is a flowchart of an example process 600 associated with network traffic transmission based on next-next-hop indication. In some implementations, one or more process blocks of FIG. 6 are performed by a network device (e.g., a node shown in FIG. 1A or 1B). In some implementations, one or more process blocks of FIG. 6 are performed by another device or a group of devices separate from or including the network device, such as a peer device (e.g., peer device 310) and/or node (e.g., node 320). Additionally, or alternatively, one or more process blocks of FIG. 6 may be performed by one or more components of device 400, such as processor 420, memory 430, input component 440, output component 450, and/or communication component 460, and/or by one or more components of device 500, such as input component 510, switching component 520, output component 530, and/or controller 540.

As shown in FIG. 6, process 600 may include receiving an indication of a next-next-hop of the network device and link quality information of the next-next-hop (block 610). For example, the network device may receive an indication of a next-next-hop of the network device and link quality information of the next-next-hop, as described above.

As further shown in FIG. 6, process 600 may include transmitting network traffic based on the indication of the next-next-hop and the link quality information of the next-next-hop (block 620). For example, the network device may transmit network traffic based on the indication of the next-next-hop and the link quality information of the next-next-hop, as described above.

Process 600 may include additional implementations, such as any single implementation or any combination of implementations described below and/or in connection with one or more other processes described elsewhere herein.

In a first implementation, receiving the indication of the next-next-hop includes receiving the indication of the next-next-hop via a non-link-state protocol.

In a second implementation, alone or in combination with the first implementation, the non-link-state protocol is a BGP.

In a third implementation, alone or in combination with one or more of the first and second implementations, receiving the indication of the next-next-hop includes receiving a BGP update message that contains the indication of the next-next-hop.

In a fourth implementation, alone or in combination with one or more of the first through third implementations, the indication of the next-next-hop is a BGP identifier in an NNHN capability of the BGP update message.

In a fifth implementation, alone or in combination with one or more of the first through fourth implementations, the indication of the next-next-hop is an AS number in an AS path attribute of the BGP update message.

In a sixth implementation, alone or in combination with one or more of the first through fifth implementations, the network device is in a Clos network.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a network device of a network, data including an indication of a next-next-hop of the network device and link quality information of the next-next-hop,
   wherein the received data does not include information associated with one or more hops that are beyond the next-next-hop, and
   wherein the next-next hop is associated with a hop of the network device after a next-hop of the network device;
   processing, by the network device, information related to the indication of the next-next-hop;
   transmitting, by the network device, network traffic based on the indication of the next-next-hop and the link quality information of the next-next-hop;
   refraining from, by the network device and based on processing the information related to the indication of the next-next-hop, propagating the indication of the next-next-hop to one or more other nodes of the network; and
   transmitting, by the network device and to one or more direct neighbor devices, another indication of another next-next-hop associated with the one or more direct neighbor devices,
   wherein there are no intervening nodes between the one or more direct neighbor devices and the network device.

2. The method of claim 1, wherein receiving the indication of the next-next-hop includes receiving the indication of the next-next-hop via a non-link-state protocol.

3. The method of claim 2, wherein the non-link-state protocol is a border gateway protocol (BGP).

4. The method of claim 3, wherein the data is associated with a BGP update message that comprises the indication of the next-next-hop.

5. The method of claim 4, wherein the indication of the next-next-hop is a BGP identifier in a next-next-hop nodes capability of the BGP update message.

6. The method of claim 4, wherein the indication of the next-next-hop is an autonomous system (AS) number in an AS path attribute of the BGP update message.

7. The method of claim 1, wherein the network device is in a Clos network.

8. The method of claim 1, further comprising:
   determining the other indication of the other next-next-hop based on using a next-next-hop nodes (NNHN) capability in a next hop dependent capabilities attribute (NHC),
   wherein the other indication of the other next-next-hop is encoded as a capability type-length-value (TLV) in a next-hop dependent capabilities attribute (NHC).

9. A network device of a network, comprising:
   one or more memories; and
   one or more processors to:
   receive a border gateway protocol (BGP) update message that comprises an indication of a next-next-hop of the network device,
   wherein the BGP update message does not include information associated with one or more hops that are beyond the next-next hop, and
   wherein the next-next hop is associated with a hop of the network device after a next-hop of the network device;
   process information related to the indication of the next-next-hop;
   transmit network traffic based on the indication of the next-next-hop;
   refrain from, based on processing the information related to the indication of the next-next-hop, propagating the indication of the next-next-hop to one or more other nodes of the network; and
   transmit, to one or more direct neighbor devices that have no intervening nodes between the one or more direct neighbor devices and the network device, another indication of another next-next-hop associated with the one or more direct neighbor devices.

10. The network device of claim 9, wherein the indication of the next-next-hop is a BGP identifier in a next-next-hop nodes capability of the BGP update message.

11. The network device of claim 10, wherein the BGP update message is associated with an exterior BGP (eBGP) session.

12. The network device of claim 10, wherein the next-next-hop nodes capability includes a plurality of BGP identifiers including the BGP identifier, and wherein the plurality of BGP identifiers correspond to a plurality of next-next-hops, including the next-next-hop, of the network device.

13. The network device of claim 10, wherein the BGP update message further comprises an indication of the next-hop that is associated with the next-next-hop, and
   wherein the one or more processors, to transmit the network traffic, are to transmit the network traffic based on the next-hop being associated with the next-next-hop.

14. The network device of claim 9, wherein the indication of the next-next-hop is an autonomous system (AS) number in an AS path attribute of the BGP update message.

15. The network device of claim 9, wherein the information related to the indication of the next-next-hop is encoded as a capability type-length-value (TLV) in a next-hop dependent capabilities attribute (NHC).

16. The network device of claim 14, wherein the network device is one of a plurality of network devices in a Clos network, and wherein each network device, of the plurality of network devices, is associated with an AS number that is unique within the Clos network.

17. A non-transitory computer-readable medium storing a set of instructions, the set of instructions comprising:
   one or more instructions that, when executed by one or more processors of a network device in a Clos network, cause the network device to:
   receive data including an indication of a next-next-hop of the network device and link quality information of the next-next-hop,
   wherein the received data does not include information associated with one or more hops that are beyond the next-next-hop, and wherein the next-next hop is associated with a hop of the network device after a next-hop of the network device;

process information related to the indication of the next-next-hop;

transmit network traffic based on the indication of the next-next-hop and the link quality information of the next-next-hop;

refrain from, based on processing the information related to the indication of the next-next-hop, propagating the indication of the next-next-hop to one or more other nodes of the Clos network; and transmit, to one or more direct neighbor devices that have no intervening nodes between the one or more direct neighbor devices and the network device, another indication of another next-next-hop associated with the one or more direct neighbor devices.

18. The non-transitory computer-readable medium of claim 17, wherein the one or more instructions, that cause the network device to receive the indication of the next-next-hop, cause the network device to:

receive the indication of the next-next-hop via a non-link-state protocol.

19. The non-transitory computer-readable medium of claim 18, wherein the non-link-state protocol is border gateway protocol (BGP).

20. The non-transitory computer-readable medium of claim 19, wherein the one or more instructions, that cause the network device to receive the indication of the next-next-hop, cause the network device to:

receive a BGP update message that includes the indication of the next-next-hop.

\* \* \* \* \*